(No Model.)
C. H. LUTZ.
ANIMAL TRAP.
No. 282,463. Patented July 31, 1883.
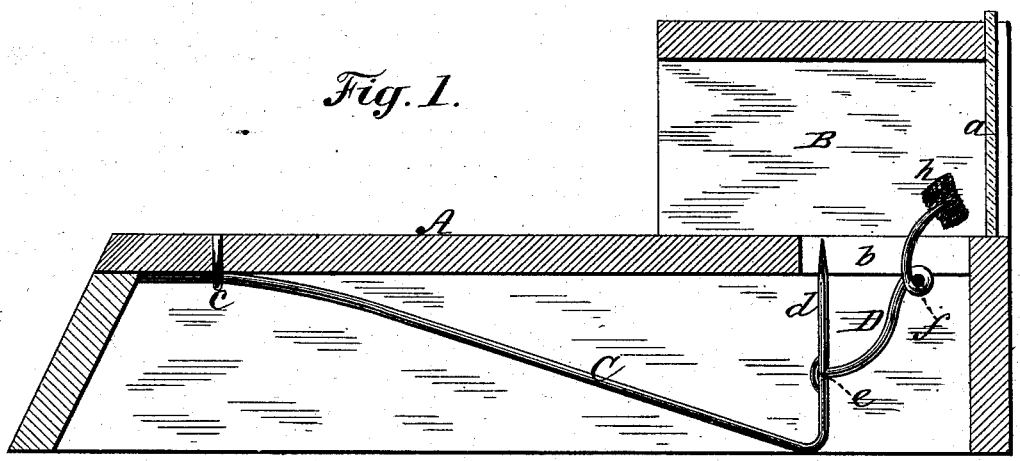
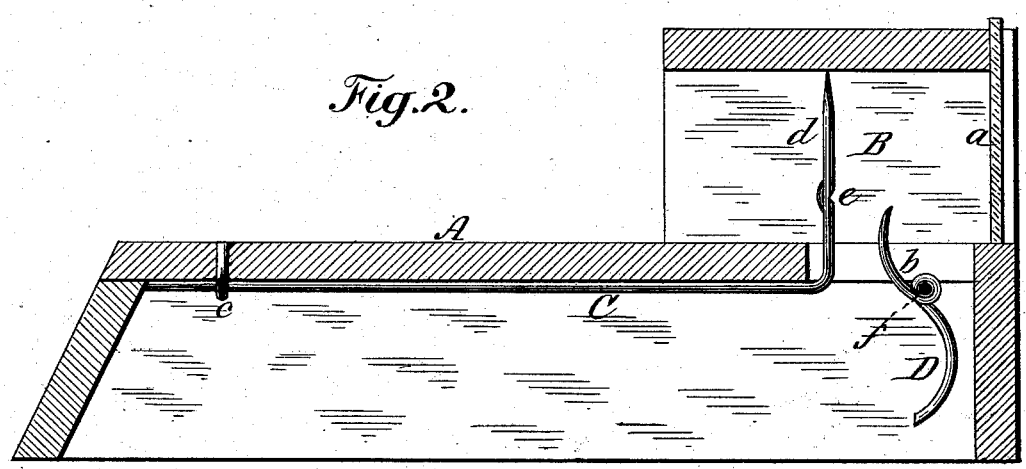
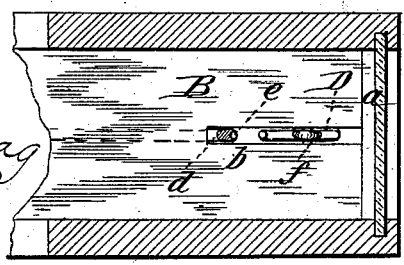
Attest:
Edmund Rodhag
W. T. Thomas
Inventor:
Charles Henry Lutz,
by his Attorneys
Johnson & Johnson

UNITED STATES PATENT OFFICE.

CHARLES H. LUTZ, OF LEWISBURG, WEST VIRGINIA, ASSIGNOR OF ONE-HALF TO FRANK C. BROWN AND JOHN F. ESTILL, OF SAME PLACE.

ANIMAL-TRAP.

SPECIFICATION forming part of Letters Patent No. 282,463, dated July 31, 1883.

Application filed June 5, 1883. (No model.)

*To all whom it may concern:*

Be it known that I, CHARLES HENRY LUTZ, a citizen of the United States, residing at Lewisburg, in the county of Greenbrier and State of West Virginia, have invented new and useful Improvements in Animal-Traps, of which the following is a specification.

The invention relates to that class of animal-traps in which the animal is impaled at the moment of touching the bait; and the object of my improvement is to simplify the construction and lessen the cost of such traps as built for trapping and killing rats and mice.

The accompanying drawings fully illustrate the construction in connection with the description, and the invention will be asserted in the claims.

In the said drawings, Figure 1 represents a vertical longitudinal section of a trap embracing my improvements as set; Fig. 2, a similar view, illustrating the trap as sprung; and Fig. 3, a detailed top view of the bait-chamber with the cover thereof removed.

In the trap thus shown, A is a platform of approach, and B a covered bait-chamber, open always at its end of approach, and sometimes either open at its other end, or closed by a sliding glass or mirror, *a*, as may be desired. In this platform A, in that part which forms the floor of the bait-chamber, is a slot, *b*, for the play of the impaling-spear and the bait-holding lever.

The impaling-spear C consists of a single spring-wire, of steel or suitable metal, fastened beneath that end of the platform, at *c*, farthest from the bait-chamber, and terminating at a right angle in an impaling part, *d*, provided in the example shown with a notch, *e*; but any other holding and tripping device attachment might answer. Upon a pin or rod, *f*, beneath this slot *b*, and secured under the platform, is pivoted a bait-holding trip-lever, D, which in Fig. 1 is shown as having one end engaged with the notch *e* of the spear C *d* when the spring-spear is depressed for setting the trap, while in Fig. 2 the parts are shown as at rest after the trap is sprung.

It is seen from the drawings that as the rat nibbles the bait *h* on one end of the trip-lever its other end is thereby disengaged from the spring-spear C *d*, which at once impales the rat. The manner of setting for another catch is obvious.

Of course the engaging end of the trip-lever may act in combination with any suitable device other than a notch on the impaling end of the spring with the same results; but the construction shown is deemed the simplest.

I have described and shown the impaling part and its projecting spring formed of a single piece of steel wire, with the impaling part bent at right angles to the spring part, and having the setting-notch *e* on its side; and this construction renders the spring much more durable and effective, since a piece of steel wire need only be bent and pointed and fastened at one end.

The bait trip-lever has two arms, and is centrally pivoted, so that the bait is held upon the upper arm, and the end of the lower arm curves toward the right-angled part and forms the setting-point. In this construction both ends of the bait trip-lever should be free, and the point of its lower end must be formed so as to be set directly within the notch *e* in the side of the impaling part *d*, so that the least pull upon the bait will free the point of the trip-lever from the notch.

The covered chamber B, closed by the glass at one end, causes the animal to pass over the impaling-point to reach the bait, serves to confine the animal when impaled, and gives the appearance of being open at both ends, while having only an entrance.

I claim—

1. In an impaling animal-trap, the impaling part *d* and its projecting spring C, formed of a single steel wire bent at right angles, rigidly secured at one end, having the notch *e* in the side of the bent impaling part, combined with the centrally-pivoted bait trip-lever, having its lower free end adapted to fit into said notch, and the slotted platform, as shown and described.

2. In an impaling-trap, the slotted platform A, provided at one end with a top-covered chamber, B, combined with the impaling-point *d e*, its projecting spring C, and the trip bait-lever D, all constructed as shown and described.

In testimony whereof I have hereunto set my hand in the presence of two subscribing witnesses.

CHARLES HENRY LUTZ.

Witnesses:
JAS. F. MONTGOMERY,
A. I. DOTSON.